(No Model.)
T. P. HIMEL.
CANE SCRAPER.
No. 324,258. Patented Aug. 11, 1885.
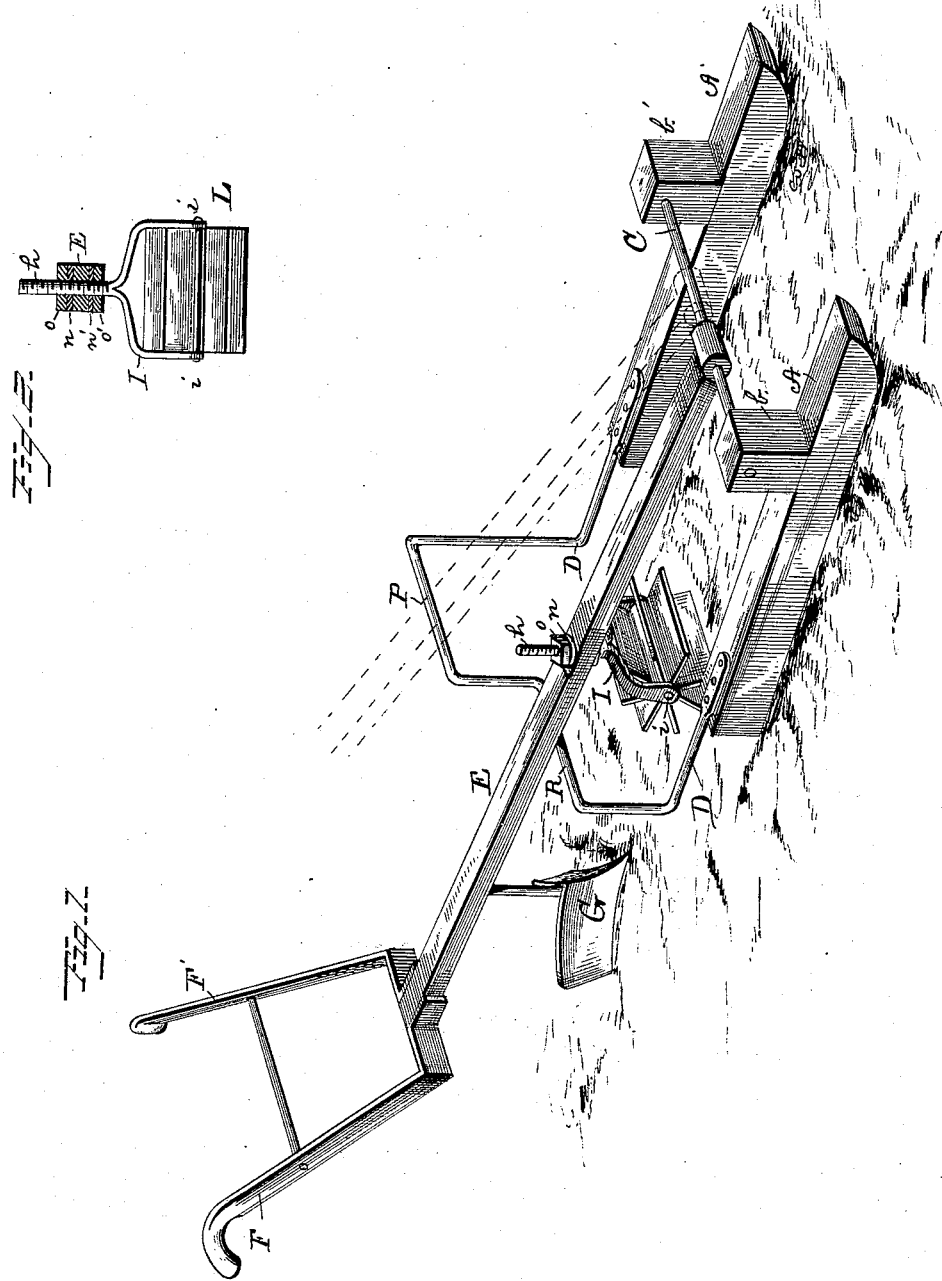
WITNESSES
F. L. Ouraud
S. B. Wilson
INVENTOR
T. P. Himel
By H. N. Jenkins
Attorney

UNITED STATES PATENT OFFICE.

TAYLOR PAUL HIMEL, OF LABADIEVILLE, LOUISIANA.

CANE-SCRAPER.

SPECIFICATION forming part of Letters Patent No. 324,258, dated August 11, 1885.

Application filed May 18, 1885. (No model.)

*To all whom it may concern:*

Be it known that I, TAYLOR P. HIMEL, a citizen of the United States, and a resident of the town of Labadieville, parish of Assumption, and State of Louisiana, have invented a certain new and useful Improvement in Cane-Scrapers; and I do hereby declare the following to be a full, clear, and correct description of the same, reference being had to the annexed drawings, making a part of this specification.

This invention relates to that class of farming implements which are used in the cultivation of sugar-cane; and it consists in the combination, with suitable runners and connecting rods or braces, of a beam provided with a scraper, and means for adjusting said beam, and thereby adapt the scraper to remove the superfluous earth covering the young sprouts or seed-cane, as hereinafter described.

The invention will be more readily understood by referring to the accompanying drawings, whereon Figure 1 is a perspective view of same, and Fig. 2 a detailed view of the means employed for adjusting the scraper.

On the drawings, the letters A A' designate a pair of runners, each provided with a vertical standard, as shown at b b', through which the same are connected at suitable distance apart by a bolt or rod, C. An additional connection is made at the rear ends of the runners by a bent rod or brace, D, which insures the runners being kept in parallel positions, and provides a double rest for the beam E, the forward end of which is loosely journaled on the rod C, along which it is adapted to be moved bodily by the attendant, as the nature of the work may require.

The rear end of the beam E is provided with a pair of handles, F F', for the proper guidance of the implement, as well as to afford means for raising or lowering the said beam to or from the upper rest of the brace D.

The beam E is provided in rear of the aforesaid brace D with a scraper, G, and in front of same with a vertical perforation, in which is inserted from the under side thereof the screw-threaded standard h of a yoke, I, in the ends of which are journaled the side pins or shaft, i, of a wheel, L, which is formed of radiating plates or blades, as shown, so as to present as little surface as possible to the canes over which they are designed to operate. As shown more clearly in Fig. 2, the standard of the yoke I is provided at each side of the beam E with washers n n' and nuts o o', whereby the same can be adjusted to the requisite height without injury to said beam.

In going to or returning from the field, and at such times as the scraper is not required to perform any work, the beam is held on the upper rest, as shown in dotted lines at P in Fig. 1. The lower rest, R, serves as a stop to prevent the beam being depressed beyond a given point. At all other elevations the said beam is supported by the wheel L, which is adjusted by the nuts o o', so as to regulate the depth at which the scraper shall operate.

To properly understand the working of this implement, it should be borne in mind that in the planting of seed-cane the same are laid horizontally in two or three parallel rows to each furrow, which are afterward covered by means of hoes or plows. Over these rows the wheel L revolves as the implement is being drawn forward by draft-animals, the traces of which are connected with the rod C, or with the forward ends of the runners, as preferred.

From the above description it will be seen that the wheel L operates at right angles to the plant-canes, and that, owing to the peculiar construction and arrangement thereof, its blades are made to successively strike and penetrate the soil to the depth of said canes, as the implement is drawn forward over same, without in any manner injuring the "eyes" or "sprouts" thereof, and without either rolling or packing the earth above same. Thus the sole object of the aforesaid wheel and its yoke-bearing is to sustain or support the beam during the operating of the machine at such elevation as to adapt its scraper to shave or level the surface of the earth above the plant-canes, and thereby insure an even depth of covering to same.

Having described my invention, what I claim as new, and desire to secure by Letters Patent, is—

1. In combination with a pair of runners connected at suitable distance apart by a rod and brace, as described, a beam journaled to the aforesaid rod, and a scraper and supporting-wheel connected with said beam, substantially as described, and for the purpose set forth.

2. In combination with the pivoted beam E, provided with supporting-wheel L and scraper G, as described, the runners A A', connecting-rod C, and brace D, the latter having rests P R, for supporting the beam at different elevations, substantially as and for the purpose specified.

In testimony whereof I affix my signature in presence of two witnesses.

TAYLOR PAUL HIMEL.

Witnesses:
 PIERRE J. GILBERT,
 R. H. WEBSTER.